March 4, 1952 S. O. SMITH 2,588,055
ARTIFICIAL LURE
Filed Aug. 13, 1949

Inventor
S. O. Smith

By W. S. McDowell

Attorney

Patented Mar. 4, 1952

2,588,055

UNITED STATES PATENT OFFICE 2,588,055

ARTIFICIAL LURE

Spurgeon O. Smith, Columbus, Ohio

Application August 13, 1949, Serial No. 110,214

2 Claims. (Cl. 43—42.13)

This invention relates to fishing lures or artificial bait of the kind used in casting or trolling operations, and it is an object of the invention to provide a lure or bait in which a captive minnow-simulating body is mounted on a line-drawn spoon-shaped frame.

It is another object of the invention to provide a fishing lure formed to include a spoon-like base from which extends a hook member, the base being also provided with a resilient weed-excluding finger which terminates contiguous to the pointed or barbed end of the hook member, the arrangement of these parts being such as to provide within the confines thereof a space in which is positioned a buoyant captive body simulating in outline the appearance of a small fish or minnow, the general construction of the lure being such that as the same is drawn by a connecting fishing line through the water, a darting life-like motion is imparted to the base and the captive body joined therewith by a flexible means.

For a further understanding of the invention, reference is to be had to the following description and the accompanying drawing, wherein.

Figure 1:
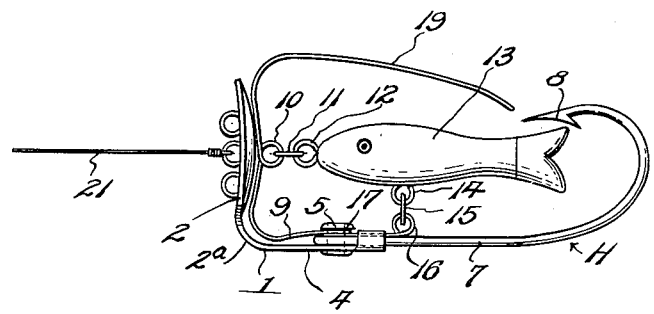
Fig. 1 is a side elevational view of a fishing lure or bait formed in accordance with the present invention.
Figure 2:
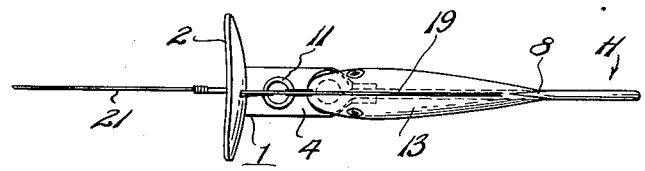
Fig. 2 is a top plan view.
Figure 4:
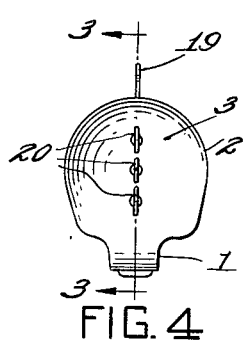
Fig. 4 is a front elevational view of the spoon-type base of the lure.
Figure 3:
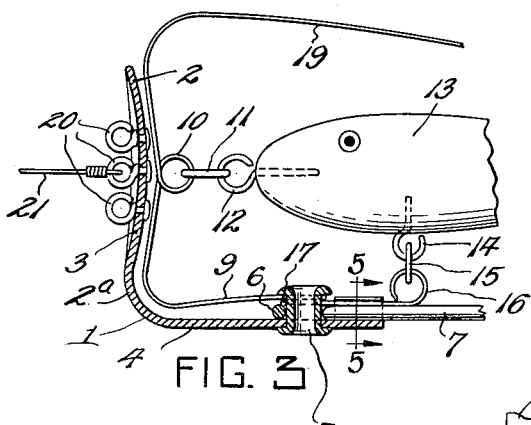
Fig. 3 is an enlarged fragmentary vertical longitudinal sectional view taken through the forward portions of the lure or bait on the line 3—3 of Fig. 4.
Figure 5:
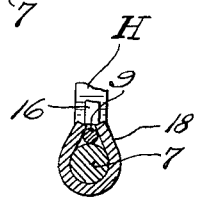
Fig. 5 is a detail transverse sectional view, taken on the line 5—5 of Fig. 3.

In a preferred form, my improved artificial lure or bait comprises a spoon-type base plate or frame 1. In this instance, the plate or frame is formed to include an upstanding forwardly disposed head 2, having a face 3 which possesses a dished or concave configuration. The head 2 of the plate or frame 1 terminates in its lower region in an arcuate web 2a which, in turn, terminates in a flat horizontally disposed and longitudinally extending hook-supporting base extension 4.

The extension 4 is provided with an opening for the reception of a rivet, pin or other equivalent fastening device 5 which receives an eye 6 provided on the forward end of a shank 7 of a hook member H, the hook member terminating rearwardly in the usual pointed and barbed extremity 8.

The rivet or pin 5 has also joined therewith for firm mechanical connection with the plate extension 4 one end of a light resilient wire member 9. This member projects forwardly from the rivet or pin 5 and is disposed at the rear of the head 2, conforming generally to the configuration of said head. The portion of the wire member disposed immediately adjacent to the rear of the head 2 is provided intermediately with an eye 10. This eye is joined by a link shown at 11 to an eye member 12 which is carried by and projects forwardly from the forward end of a lure body 13 which, in this instance, is of buoyant sheet metal construction shaped to the configuration of a small minnow or fish. Preferably the minnow is provided exteriorly with a silvery finish, although this coloration is subject to modification. To confine the minnow body 13 and yet to permit of its limited movement, the under side thereof is formed with an eye member 14. The latter is joined by a link 15 with an eye 16 formed with the rear end of the wire member 9. The wire member is wrapped around the shank of the pin or rivet 5 as at 17 and is confined in place by the headed or beaded ends of the pin or rivet. From the latter the wire member projects through a sleeve or guide 18 to its eye region 16.

The forward portion of the wire member 9 in which the eye 10 is formed extends upwardly and terminates in a rearwardly disposed resilient finger 19, the latter being fixed above the minnow body 13 and terminating at its rear end in resiliently spaced relation from the barbed or pointed extremity 8 of the hook member H, the finger serving as a means for preventing the hook from being fouled by weeds or from engaging other snagging obstructions. The front surface of the head 2 of the plate or frame 1 is provided with a plurality of vertically disposed eyes 20 with any one of which a fishing line shown at 21 may be connected. Through the use of these eyes, the fishing line 21 may be so connected with the artificial lure as to control the depth of immersion thereof in a body of water. When the line 21 is connected with the uppermost of the eyes 20, the lure tends to ride on or just below the surface of the water. Proportionately greater depths of operation are obtainable by connecting the line with the intermediate and lower of said eyes.

As the lure is drawn through the water, both the spoon-type frame and captive minnow pursue a darting zigzag course with respect to a straight longitudinal course of travel, thus imparting an animated life-like action to the lure which increases its effectiveness as a bait. The construction of the lure is such as to impart thereto simplicity and sturdiness so that it is not likely to become out of order or require repair or adjustment.

I am aware that changes in the construction and form of the above described embodiment of my invention may be made without departing from the spirit of my invention, the scope of which should, accordingly be determined by reference to the following claims, the same being construed as broadly as possible consistent with the state of the art.

I claim:

1. An artificial lure comprising a plate having an upstanding forwardly disposed head portion and an angularly disposed and rearwardly extending mounting extension, a hook member having a shank formed at one end with a pointed and barbed terminal and at its other with an eye, a fastening pin passing through said eye and joining said hook member with the rearward extension of said plate, a wire member connected with said plate by said pin, said wire member including a looped forward portion disposed at the rear of the head portion of said plate and extending longitudinally above said mounting extension, said wire member terminating in a rearwardly extending resilient finger having resiliently movable registry with the pointed and barbed terminal of said hook member, a buoyant body shaped to simulate the appearance of a small fish disposed within the confines of said plate, hook member and resilient finger, and means flexibly linking said body at two points with said wire member and providing for limited wiggling movement of said body within the confines of said plate, hook member and resilient finger.

2. In a fishing lure; a plate-like body formed with an upstanding, forwardly disposed, concavo-convex head portion and a perpendicularly related, rearwardly extending, hook-attaching portion; a hook formed at one end with an eyelet and at its opposite end with a curved and barbed pointed extremity and carried in rearwardly extending order on the hook-attaching portion of said plate-like body; a resiliently flexible wire connected with the attaching portion of said body and extending upwardly in back of the head portion of said body and then rearwardly above the hook-attaching portion of said body, said wire being formed adjacent the connection thereof with said body with a closed loop and adjacent the head portion of said body with a second closed loop, and terminating in a resiliently flexible weed-guard finger disposed adjacent to the pointed extremity of said hook; a buoyant minnow-simulating body; and flexible link means connecting said minnow-simulating body with the closed loops of said wire, said minnow-simulating body being confined between said plate-like body, said hook, and the flexible weed-guard finger of said wire.

SPURGEON O. SMITH.

REFERENCES CITED

The following references are of record in the file of this patent:

UNITED STATES PATENTS

| Number | Name | Date |
| --- | --- | --- |
| 1,615,963 | Stanley | Feb. 1, 1927 |
| 1,888,641 | Toepper | Nov. 22, 1932 |
| 2,021,796 | Liotta | Nov. 19, 1935 |
| 2,220,133 | Sweeney | Nov. 5, 1940 |
| 2,281,578 | Heddon | May 5, 1942 |
| 2,295,375 | Adam | Sept. 8, 1942 |
| 2,374,279 | Fugler | Apr. 24, 1945 |